United States Patent [19]

Havens

[11] Patent Number: 5,273,135
[45] Date of Patent: Dec. 28, 1993

[54] METHOD OF CHARGING A HYDROSTATIC TRANSMISSION WITH OIL

[75] Inventor: Dale I. Havens, Addison, Mich.

[73] Assignee: Tecumseh Products Company, Tecumseh, Mich.

[21] Appl. No.: 855,120

[22] Filed: Mar. 18, 1992

Related U.S. Application Data

[63] Continuation of Ser. No. 654,329, Feb. 12, 1991, abandoned.

[51] Int. Cl.$^5$ ............................................. F01M 11/08
[52] U.S. Cl. .................. 184/6.23; 184/105.1; 60/453; 141/5
[58] Field of Search .................. 55/189, 195, 55; 60/453, 336, 378; 141/5, 59, 98; 184/6.21, 6.22, 6.23, 6.12, 105.1

[56] References Cited

U.S. PATENT DOCUMENTS

| | | | |
|---|---|---|---|
| 2,257,945 | 10/1941 | Fraser | 252/32 |
| 2,797,767 | 7/1957 | Brooke et al. | 183/2.5 |
| 2,798,573 | 7/1957 | Vesterdal et al. | 183/114 |
| 2,820,564 | 1/1958 | Solomon | 215/231 |
| 3,343,701 | 9/1967 | Mahoney | 215/231 |
| 3,538,682 | 11/1970 | Chattin et al. | 55/51 |
| 3,561,193 | 2/1971 | Baranowski | 55/46 |
| 3,777,848 | 12/1973 | Schaeffer et al. | 184/6.23 |
| 3,789,579 | 2/1974 | El-Hindi | 55/50 |
| 3,815,329 | 6/1974 | Pande-Rolfsen | 55/163 |
| 3,991,568 | 11/1976 | Latimer et al. | 60/453 |
| 4,345,920 | 8/1982 | Ross | 55/46 |
| 4,356,006 | 10/1982 | Miller et al. | 55/55 |
| 4,385,909 | 5/1983 | Starr | 55/55 |
| 4,432,775 | 2/1984 | Won | 55/41 |
| 4,531,368 | 7/1985 | Killen | 60/453 |
| 4,548,622 | 10/1985 | Suzuki et al. | 55/204 |
| 4,561,866 | 12/1985 | Altmann et al. | 55/166 |
| 4,681,189 | 7/1987 | Krisiloff | 184/6.23 |
| 4,696,684 | 9/1987 | Shen | 55/189 |
| 4,842,107 | 6/1989 | Buchanan et al. | 60/378 |
| 4,854,945 | 8/1989 | Ferree et al. | 55/189 |
| 4,895,192 | 1/1990 | Mortenson | 141/5 |
| 4,987,796 | 1/1991 | Von Kaler et al. | 74/606 R |
| 5,001,901 | 3/1991 | Erickson et al. | 60/453 |
| 5,010,733 | 4/1991 | Johnson | 60/453 |
| 5,060,703 | 10/1991 | Koerner | 141/59 |

FOREIGN PATENT DOCUMENTS

| | | | |
|---|---|---|---|
| 0244219 | 12/1965 | Australia | 215/231 |
| 0399670 | 9/1924 | Fed. Rep. of Germany | 60/453 |
| 1175057 | of 1964 | Fed. Rep. of Germany . | |
| 1002334 | of 1952 | France . | |
| 342275 | of 1959 | Switzerland . | |
| 1414410 | 7/1988 | U.S.S.R. | 55/189 |
| 1090914 | of 1967 | United Kingdom . | |

OTHER PUBLICATIONS

Hayward (Scotland, Nov. 1963) "Hydraulics and Pneumatics" Nov. 1963.

*Primary Examiner*—Albert J. Makay
*Assistant Examiner*—Alan B. Cariaso
*Attorney, Agent, or Firm*—Baker & Daniels

[57] ABSTRACT

A method of charging a hydrostatic transmission with deaerated transmission oil wherein a hollow-bodied bellows attached to a housing plate for placement within the hydrostatic transmission housing, and a bleed plug for a bleed hole are removed, and the deaerated oil is caused to fill the transmission housing. Once the transmission has been completely charged such that the oil is at the bleed hole level, the hollow-bodied bellows attached to the housing plate is then secured to the hydrostatic transmission housing causing excess oil and air initially trapped within the hydrostatic transmission housing, to be purged through the bleed hole, while the transmission bleed hole plug is then secured into the transmission bleed hole.

16 Claims, 2 Drawing Sheets

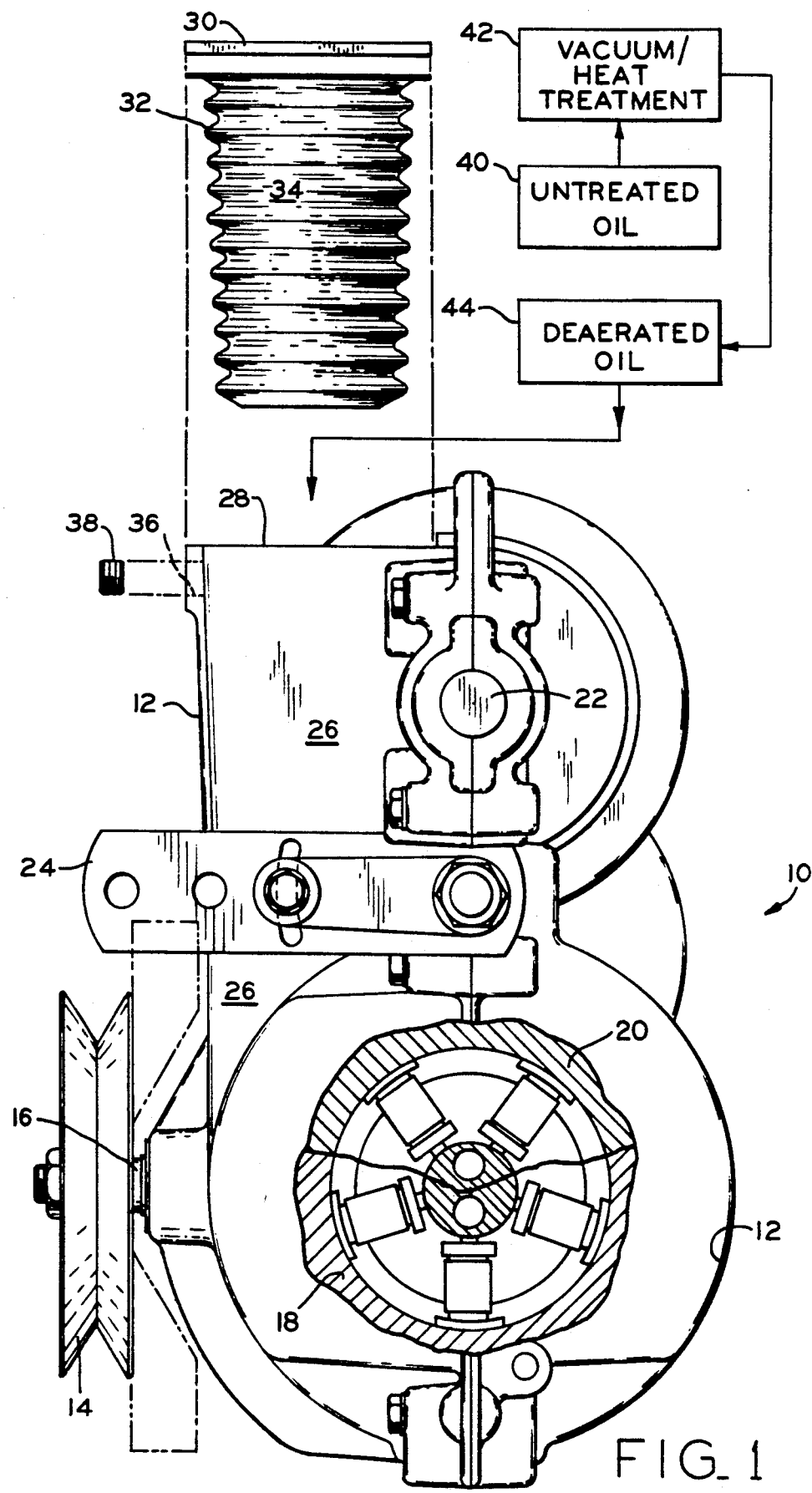
FIG_1

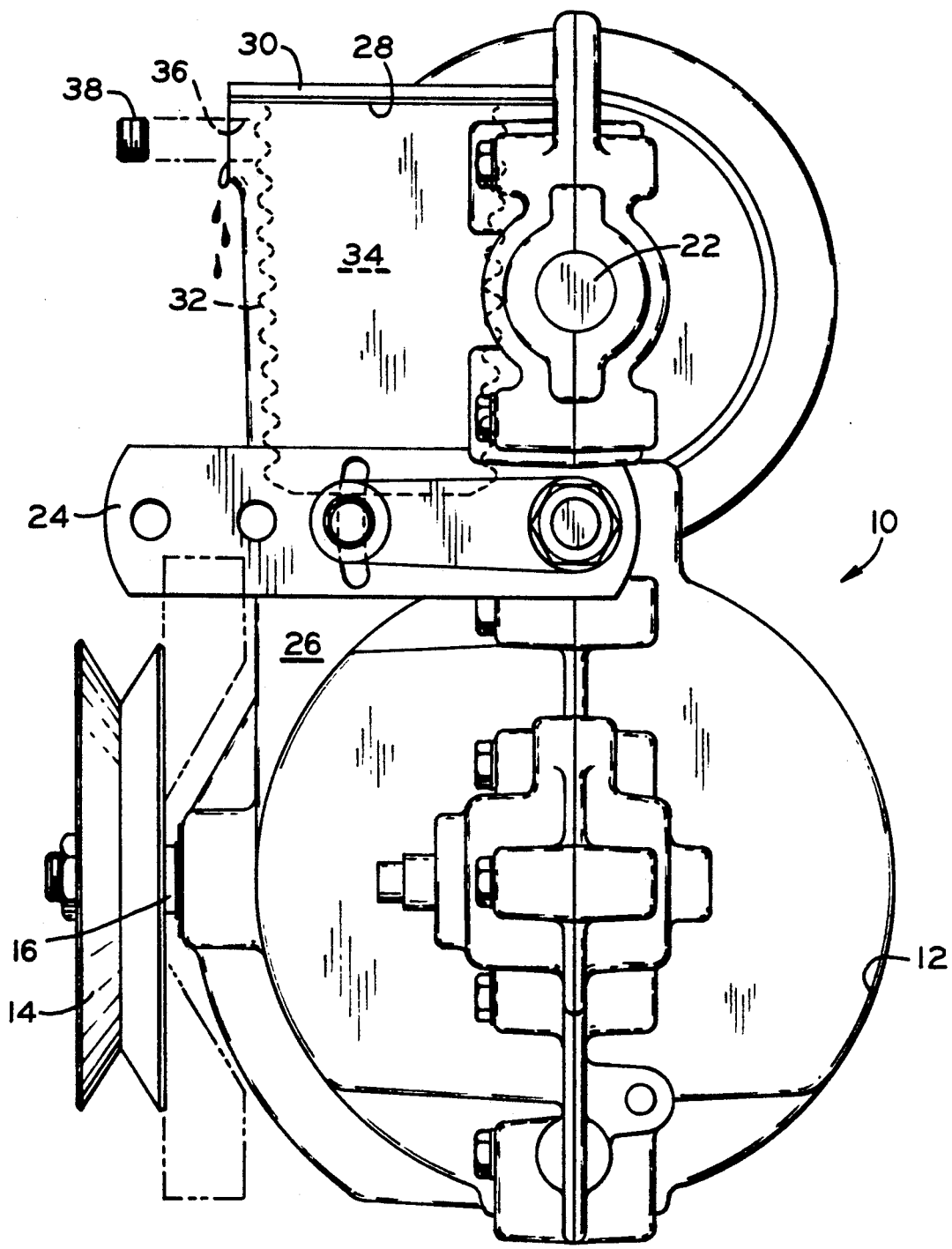
FIG_2

METHOD OF CHARGING A HYDROSTATIC TRANSMISSION WITH OIL

This is a continuation of application Ser. No. 07/654,329, filed Feb. 12, 1991 abandoned.

BACKGROUND OF THE INVENTION

1. Field of the Invention

The present invention is generally concerned with hydrostatic transmissions and, more particularly, is concerned with a method of charging a hydrostatic transmission with oil such that the oil will not foam within the hydrostatic transmission.

2. Description of the Prior Art

Hydrostatic transmissions and transaxles (HST's) transmit rotary motion from an input shaft to an output shaft by means of a hydraulic pump and hydraulic motor along with various gearing enclosed within a housing filled with oil. The input shaft is connected, for example, to an engine, while the output shaft can be connected, for example, to the driving wheels of a vehicle such as a lawn and garden tractor. HST's are well known in the art and are manufactured in various configurations. One such HST having a hollow-bodied bellows within an oil reservoir defined by the HST housing, is disclosed in U.S. Pat. No. 4,987,796 entitled, "Internal Reservoir-Defining Body For Permitting Oil Expansion Within A Hydrostatic Transmission Housing," by Roland L. von Kaler filed Jun. 12, 1989, incorporated herein by reference.

An HST cannot function without oil. The oil, however, can be a source of problems working against the efficient operation and long-term reliability of the HST. This is because most oils contain a significant amount of dissolved or entrained air, which is usually on the order of about 10% air per volume of oil. This entrained air is what causes a multitude of problems within the HST.

One such problem is foaming. Foaming occurs as a result of entrained air forming excessive bubbles as the oil is agitated by the pump, motor, gears, and other HST components. This is detrimental to HST function by severely reducing the life and efficiency of the HST components. In addition, foaming causes excess noise during operation.

Another problem with air entrained oil concerns the compressibility of the oil. HST's, like all hydraulic systems, rely on the incompressibility of oil to transmit motion to the various components. Entrained air allows the oil to compress which reduces efficiency.

As a further consequence of air entrained oil, the effective operating temperature of the oil is reduced so that thermal breakdown occurs at a lower temperature. Still further, air entrained oil promotes moisture retention leading to quicker oil breakdown. When the oil breaks down it cannot properly function as intended, causing deleterious effects to the HST.

Deaerated oil has been used in environments such as compressors. Furthermore, several prior art devices and methods have been devised in order to remove entrained air from oils and greases utilizing methods such as vacuum or heat treating, but not in conjunction with a method whereby the deaerated oil is charged into an HST such that further air entrainment will not occur and the air currently within the HST housing is displaced.

SUMMARY OF THE INVENTION

The present invention relates to a method of charging an HST with deaerated oil thereby preventing air entrained oil reactions once inside the HST.

The present method solves the above problems by virtually eliminating entrained air in the oil before, during, and after charging the HST.

In accordance with one form of the present invention, hydraulic or transmission oil is deaerated by a vacuum or heat technique and stored in an air impervious tank. Likewise, other methods known in the art may be utilized to deaerate the oil. The HST is designed such that it has an expandable and contractable hollow-bodied bellows disposed within the HST housing connected to a plate which, when assembled, forms a portion of the housing. An oil bleed hole is disposed in the housing communicating between the interior and exterior of the HST in order to allow displaced air and excess oil within the HST housing to escape when a bleed hole plug is not present. During charging of the HST with the deaerated oil, the hollow bellows and attached plate are removed along with the bleed hole plug while the HST is filled with the oil. Once the HST is completely filled with the previously deaerated oil, the expanded hollow-bodied bellows and plate are refitted onto the HST and hermetically sealed thereto. When placed in the HST, the expanded hollow-bodied bellows compresses slightly as the oil bleeds from the bleed hole. As the bellows fully expands, it displaces oil within the HST, consequently displacing more air and excess oil forcing it to bleed from the oil bleed hole, at which time the bleed plug is placed into the bleed hole.

Untreated oil is first deaerated and then caused to substantially completely fill the HST through an inlet, after which the inlet is sealed.

It is therefore an object of the present invention to provide a method whereby all of the problems associated with air entrained oil within an HST are eliminated.

It is further an object of the present invention to provide a simple yet effective method for charging an HST with deaerated oil such that air initially within the HST is purged and the HST is sealed so the oil cannot be reaerated.

BRIEF DESCRIPTION OF THE DRAWINGS

The above mentioned and other features and objects of this invention, and the manner of attaining them, will become more apparent and the invention itself will be better understood by reference to the following description of the embodiment of the invention taken in conjunction with the accompanying drawings, wherein:

FIG. 1 is an elevational view of the hydrostatic transmission with the hollow-bodied bellows and plate removed along with the bleed hole plug; an FIG. 2 is an elevational view of the hydrostatic transmission after being charged with oil, having its bellows-like hollow body and plate replaced before the bleed hole plug is replaced.

Corresponding reference characters indicate corresponding parts throughout the several views. The exemplification set forth herein illustrates a preferred embodiment of the invention, in one form thereof, and such exemplification is not to be construed as limiting the scope of the invention in any manner.

DESCRIPTION OF THE PREFERRED EMBODIMENT

Referring to FIGS. 1 and 2, there is shown a hydrostatic transmission (HST) 10 including a housing 12. A more complete disclosure of the HST is given in U.S. patent application No. 07/364,897 and also in co-pending application No. 07/535,462 filed Jun. 8, 1990 incorporated by reference herein.

A pulley 14, connected to an external power source via a belt (not shown) such as a conventional internal combustion engine (not shown), is secured to a vertically oriented drive shaft 16 extending into housing 12. Drive shaft 16 is rotatably connected through gearing (not shown) to a hydrostatic pump 18 which in turn powers a hydrostatic motor 20. Through a series of gears and a differential (not shown) motor 20 transmits its rotational energy to horizontal wheel axles 22 which are connected to external wheels (not shown). A speed control lever 24 is disposed between wheel axle 22 and the pump 18 and motor 20 for varying the output of the hydrostatic pump and motor which consequently varies the rotational speed of wheel axle 22 in the forward and reverse directions.

Housing 12 forms an internal chamber 26 which is completely filled with oil when the hydrostatic transmission is in operation and which communicates with all internal components. An opening 28 is formed in housing 12 which allows external communication with chamber 26 in order to charge the hydrostatic transmission with oil, and is adapted to detachably receive a sealing plate 30 thereby forming a part of housing 12 when so secured. Attached to plate 30 is a bellows 32 that contracts and expands within chamber 26 in response to internal HST oil pressure and which defines an oil impervious, air filled hollow 34. A bleed hole 36 is disposed in housing 12 in close proximity to plate 30 which allows air and oil to flow therefrom when the air and oil are displaced by bellows 32. The placement of bleed hole 36 is such as to allow the HST to virtually completely fill with oil after the bellows 32 is placed within chamber 26 so that the HST will be charged with the maximum amount of oil possible. A bleed plug 38 is adapted to be detachably and sealingly secured in bleed hole 36.

With the aid of FIGS. 1 and 2, the method of the present invention will now be described. The oil to fill the HST must first be chosen. The choice of oil to fill the HST is notable as the tendency of oils to foam and the stability of foams vary widely. Although the present method virtually eliminates air entrainment in oil, it is prudent to choose an oil which will nearly prevent foaming due to its inherent characteristics. An ideal oil is, therefore, one which would be highly resistant to air entrainment and would not retain bubbles, hence foam, once they form. An oil's air entrainment and foaming tendencies are related to its viscosity, oxidation resistance, and the addition of defoaming additives. Generally, the lower the oil's viscosity the less foam, although a higher viscosity oil has greater resistance to foaming, the foam does not easily break down once it has formed. Therefore, it is necessary to strike an equilibrium between a high and low viscosity in order to keep foaming at a minimum. The oxidation resistance of the oil is another factor contributing to air entrainment that is more complex than viscosity. Oxidation increases viscosity, but can increase foaming while some products of oxidation stabilize foam. An example of such an oil which takes into account all of the above factors is Mobil Oil Company 10 W/30—Engine Oil.

The chosen untreated oil 40 is first deaerated by utilizing a vacuum or heat treatment method 42, or any other known method in the art whereby air or gas is virtually fully removed from the oil. The now deaerated oil 44 is stored within an air impervious container (not shown) for later dispensing into the HST. As shown in FIG. 1, plate 30 with attached bellows 32 is removed from HST housing 12, while bleed plug 38 is also removed from bleed hole 36.

The HST is positioned such that opening 28 is facing upward. The HST is then filled with the previously deaerated oil 44 through opening 28 with a pre measured amount of oil. Care must be taken when filling the HST with the deaerated oil 44 so that air is not reintroduced into the previously deaerated oil. Reintroduction of air into the oil can occur, for example, as a result of splashing the oil onto the internal HST components or agitating the oil when filling. In order to virtually eliminate the reintroduction of air into the previously deaerated oil the HST should be filled from the bottom, and the fill hose outlet should not rise above the liquid level of the oil.

The HST is run at a low speed in order to fill each internal cylinder and area with the deaerated oil. Once the HST has been charge with the previously deaerated oil, plate 30 with attached bellows 32 is sealingly, but detachably secured to housing 12. Bellows 32 is partially expanded which slightly compresses due to the static fluid pressure of the oil. As bellows 32 continues to expand, air trapped in the chamber 26 and excess oil will rise to and be expunged through bleed hole 36 as oil is displaced by bellows 32 when inserted into chamber 26. When plate 32 is secured to housing 12, bleed plug 38 is sealingly, but detachably secured in bleed hole 36 thereby preventing air from reentering chamber 26. The unit is now fully charged with oil and only a small amount of air in the region of bleed hole 36 remains.

If during service work it is necessary to open the HST the same procedure may be utilized to fill the HST. Previously deaerated oil can be stored in shippable air impervious containers to charge the HST.

While this invention has been described as having a preferred method, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of charging with oil a hydrostatic transmission that is at least partially empty, said method comprising the steps of:
   first deaerating the oil;
   then filling the hydrostatic transmission substantially completely with the deaerated oil through an inlet that opens to the ambient environment; and then
   sealing the inlet closed whereby the deaerated oil within the hydrostatic transmission is sealed from the ambient atmosphere.

2. The method of claim 1, wherein deaerating the oil comprises heating the oil.

3. The method of claim 1, wherein deaerating the oil comprises subjecting the oil to a vacuum.

4. The method of claim 1, further comprising the step of running the hydrostatic transmission after filling with deaerated oil but before sealing the inlet.

5. The method of claim 1, further comprising the step of inserting a resiliently collapsible structure into the hydrostatic transmission via the inlet before sealing the inlet closed, the resiliently collapsible structure providing a variable volume within the hydrostatic transmission by contracting and expanding to accommodate respective oil expansion and contraction in order to maintain the sealed hydrostatic transmission substantially completely full of oil.

6. The method of claim 1, further comprising the steps of:
allowing excess oil and purged air to bleed from a bleed hole after sealing the inlet closed; and
sealing the bleed hole.

7. A method of charging a hydrostatic transmission with oil which comprises the steps of:
deaerating the oil;
filling the hydrostatic transmission substantially completely with the deaerated oil through an external access opening in the transmission;
running the hydrostatic transmission;
then inserting a bellows through the external access opening into the hydrostatic transmission chamber;
allowing excess oil and purged air displaced by the bellows to bleed from a bleed hole; and
sealing the access opening and the bleed hole.

8. The method of claim 7, wherein deaerating the oil comprises heating the oil.

9. The method of claim 7, wherein deaerating the oil comprises subjecting the oil to a vacuum.

10. A method of charging a hydrostatic transmission with oil which comprises the steps of:
first deaerating the oil;
filling then a hydrostatic transmission housing substantially completely with the deaerated oil through an inlet that opens to the ambient environment;
inserting a resiliently collapsible structure into the hydrostatic transmission housing via the inlet, the resiliently collapsible structure providing a variable volume within the hydrostatic transmission by contracting and expanding to accommodate respective oil expansion and contraction in order to maintain the hydrostatic transmission substantially completely full of oil; and
sealing the inlet closed whereby the oil within the hydrostatic transmission housing is completely sealed from the ambient environment.

11. The method of claim 10, wherein the step of deaerating the oil comprises heating the oil.

12. The method of claim 10, wherein the step of deaerating the oil comprises subjecting the oil to a vacuum.

13. A hydrostatic transmission comprising:
a housing defining a chamber therein, said housing completely sealed from the ambient environment;
a pump and motor in said housing;
a resiliently collapsible structure disposed in said chamber, the resiliently collapsible structure providing a variable volume within the hydrostatic transmission by contracting and expanding to accommodate respective oil expansion and contraction in order to maintain the hydrostatic transmission substantially completely fill of oil; and
previously deaerated oil disposed in said chamber, said oil constituting the working fluid for said pump and motor.

14. The hydrostatic transmission of claim 13, wherein said housing includes an inlet for charging the hydrostatic transmission with the deaerated oil, said inlet being sealed whereby said housing is sealed from the ambient environment.

15. The hydrostatic transmission of claim 14, wherein said housing further comprises a sealable bleed hole for purging excess oil from said housing during charging with oil, whereby when said blend hole is sealed the oil within said housing is sealed from the ambient environment.

16. A method of charging with oil a hydrostatic transmission, said method comprising the steps of:
first deaerating the oil;
then filling the hydrostatic transmission substantially completely with the deaerated oil through an inlet that opens to the ambient environment; and then
sealing the inlet closed whereby the deaerated oil within the hydrostatic transmission is sealed from the ambient atmosphere.

* * * * *

UNITED STATES PATENT AND TRADEMARK OFFICE
CERTIFICATE OF CORRECTION

PATENT NO. : 5,273,135
DATED : December 28, 1993
INVENTOR(S) : Dale I. Havens

It is certified that error appears in the above-identified patent and that said Letters Patent is hereby corrected as shown below:

Claim 4, column 5, line 3, after "sealing" insert --closed--.

Claim 10, column 5, line 37, delete "filling then" and insert therefor --then filling--.

Claim 13, column 6, line 21, delete "fill" and insert therefor --full--.

Signed and Sealed this

Seventeenth Day of May, 1994

Attest:

BRUCE LEHMAN

Attesting Officer     Commissioner of Patents and Trademarks